Figure 1:
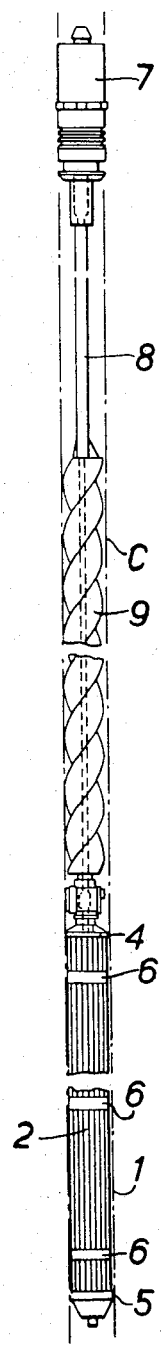

Dec. 5, 1967   A. C. A. SAUNDERS   3,356,582
NUCLEAR REACTOR FUEL ELEMENT ASSEMBLIES
Filed Aug. 4, 1965   3 Sheets-Sheet 1

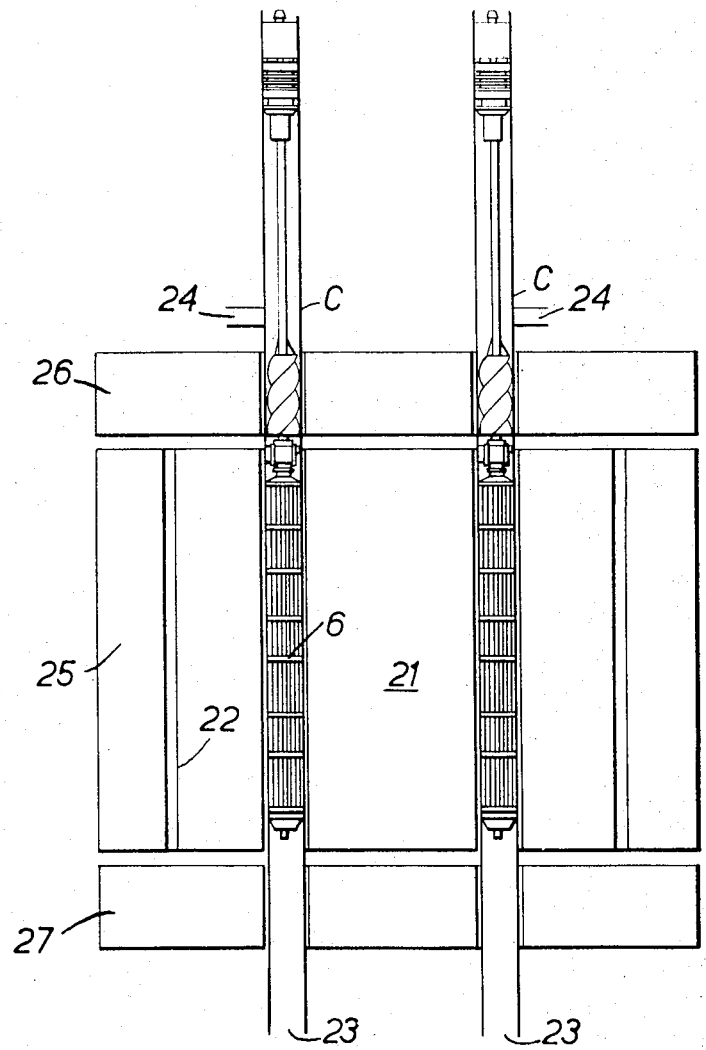

United States Patent Office 3,356,582
Patented Dec. 5, 1967

3,356,582
NUCLEAR REACTOR FUEL ELEMENT
ASSEMBLIES
Alan Charles Anthony Saunders, Ribbleton, Preston,
England, assignor to United Kingdom Atomic Energy
Authority, London, England
Filed Aug. 4, 1965, Ser. No. 477,106
Claims priority, application Great Britain,
Aug. 11, 1964, 32,763/64
4 Claims. (Cl. 176—41)

This invention relates to nuclear reactor fuel element assemblies of the kind comprising a cluster of end supported, spaced, parallel fuel rods and transverse bracing grids for the fuel rods disposed intermediate the end supports, hereinafter referred to as fuel element assemblies of the kind described.

Fuel element assemblies of the kind described are commonly used in nuclear reactor cores comprising a bulk of moderating material penetrated by tubular members or coolant tubes for containing the fuel element assemblies and for conducting coolant flow in liquid phase in heat exchange with the fuel element assemblies to generate coolant in gaseous phase. An example of this kind of nuclear reactor core is the steam generating heavy water moderated reactor described in Nuclear Engineering of February 1964.

The transverse bracing grids commonly used in fuel element assemblies of the kind described comprise thin wall members arranged edge on to coolant flow through the fuel element assembly and defining a group of cells enclosed within a peripheral rim. The cells are penetrated by the fuel rods and in use in a nuclear reactor core the coolant is arranged to flow longitudinally of the tubular member through and about the fuel element assembly. Difficulty is sometimes experienced in such reactors in providing efficient cooling for the fuel rods of the cluster because of the poor heat transfer characteristic of the vapour phase coolant created by contact of the liquid coolant with the surfaces of the fuel rods so that, in order to avoid "burn-out" of the fuel rods due to high surface temperatures, it is necessary to limit the power output of the reactor.

According to the invention, in a nuclear reactor fuel element assembly comprising a cluster of end supported, spaced, parallel fuel rods and a transverse bracing grid for the fuel rods disposed intermediate the end supports, the rim of the bracing grid is adapted for resiliently engaging at its periphery the inner wall surface of a tubular member of a nuclear reactor core.

In use in a nuclear reactor core the rim of the grid presents an obstruction to liquid film flow of liquid phase coolant along the wall of the tubular member so that the flow is directed on to fuel rod surfaces to displace vapor phase coolant created by contact of the coolant with the fuel rod surfaces. The improved cooling of the fuel rods achieved by this means enables the reactor operating temperatures and consequently power output to be increased.

The invention also resides in a transverse bracing grid for a nuclear reactor fuel element assembly wherein the rim has a skirt having slits to define resilient fingers and the fingers are formed such that the boundary of the skirt is larger than the boundary of the rim so that in use in a fuel element assembly in a nuclear reactor core the skirt peripherally engages the inner wall surface of a tubular member.

The invention further provides a nuclear reactor core comprising a bulk of moderating material penetrated by tubular members containing nuclear fuel and for conducting coolant flow in liquid phase in heat exchange with the fuel to generate coolant in gaseous phase, the core having fuel element assemblies each comprising at least one cluster of end supported, spaced parallel fuel rods and a transverse bracing grid wherein the rim of the bracing grid resiliently engages at its periphery the inner wall surface of a tubular member.

Figure 4:
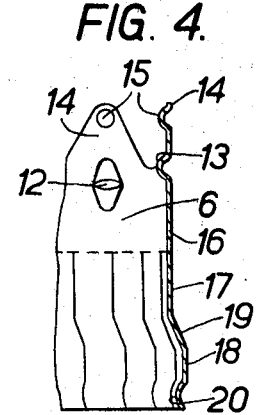
Figure 2:
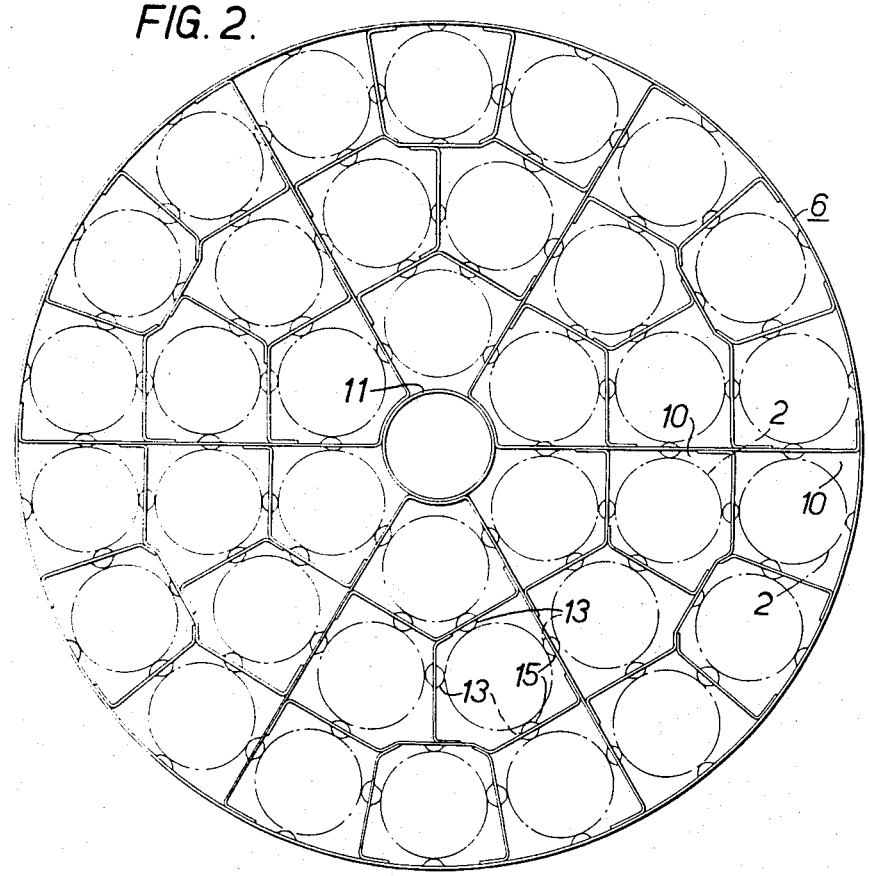
Figure 3:
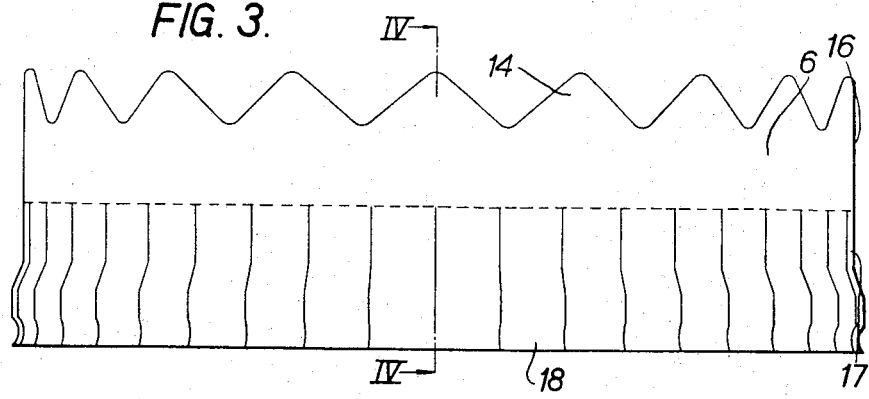

A constructional embodiment of the invention will now be described, by way of example, with reference to the accompanying drawings wherein:

FIGURE 1 is a fragmentary side view of a fuel element assembly of the kind described,
FIGURE 2 is a plan view of one construction of transverse bracing grid,
FIGURE 3 is a side view of a transverse bracing grid,
FIGURE 4 is a side view in section on line IV—IV of FIGURE 3, and
FIGURE 5 is a diagrammatic side view of a nuclear reactor core.

In FIGURE 1 there is shown a nuclear reactor fuel element assembly comprising a cluster 1 of end supported spaced parallel fuel rods 2 and transverse bracing grids 6 for the fuel rods disposed intermediate the end supports 4, 5. The bracing grids 6 are adapted for resiliently engaging at their peripheries the inner wall surface of a nuclear reactor core tubular member or coolant tube designated C.

As shown in FIGURES 3 and 4, the bracing grids 6 each have a rim 16 which is adapted for resiliently engaging at its periphery the inner wall surface of a nuclear reactor core tubular member by a skirt 17 having slits to define resilient fingers 18, the fingers being formed such that the boundary of the skirt is larger than the boundary of the rim.

The tubular member C shown in FIGURE 1 is one of a group of tubular members in a nuclear reactor core shown diagrammatically in FIGURE 5. The core comprises a bulk of moderating material 21 (heavy water) contained by a calandria vessel 22 and penetrated by the tubular members C (only two of which are shown) each of which contains a nuclear fuel element assembly. The tubular members C have inlet ports 23 for coolant (a mixture of light water and steam) which flows upwardly in heat exchange with the fuel to generate steam and out of the tubular members via ports 24. The calandria vessel 22 has side, top and bottom neutron shield tanks 25, 26, 27 which contain light water.

In greater detail, the cluster 1 comprises thirty-six fuel rods 2 arranged on three concentric pitch circles about a central hollow tube. The fuel rods are end located by a plate 4 and a support grid 5, the rods being secured to the plate 4 which thereby controls the cluster geometry and slidably guided by the grid 5 to compensate for linear thermal expansion. Intermediate the end plate 4 and the grid 5 the transverse bracing grids 6 are spaced at 12" intervals the overall length of the fuel rods 2 being 12'7½". The cluster 1 is attached to a seal plug 7 for closing the upper end of the vertically disposed tubular member C by a tie member 8 and intermediate the length of the tie member 8 there is a helically finned neutron shield plug 9 which prevents streaming of neutrons along the channel but enables flow of coolant therealong.

The transverse bracing grids 6 as shown in FIGURE 2 are constructed from stainless steel sinuous strip and each defines thirty-six cells 10 about a central ferrule 11. Each of the cells 10 is penetrated by a fuel rod 2 (shown in chain-dot line) and the central ferrule 11 is penetrated by the hollow tube to which the grid is secured by welding. The strips are slit at 12 (FIGURE 4) and are deformed to produce the opposed pads 13 shown in FIGURE 2. Each cell 10 has four inwardly directed concyclic pads 13 which lie on a circle within the limits of diameter .638"/.632." The nominal outside diameter of each fuel rod 2 is .625" so that the pads 13 whilst normally offering free passage to fuel rods, actually limit the spacing by bowing of the rods. Referring now to FIGURES 3 and 4, the upper edges of the sinuous strips are formed with castellations which define spring fingers 14, each castellation having a pad 15 pressed therein. The pads 15 are directed inwardly to each cell 10 (as shown in FIGURE 2) there being two pads to a cell. The pads 15 are biased inwardly of the bracing grid 6 and bear on the fuel rods 2 so that the rods are urged inwardly of the cluster and each against two of the pads 13.

The slitted skirt 17 has forty equally spaced resilient fingers 18 which are formed at 19 to give an external diameter greater than the bore of the tubular member C so that when the fuel element assembly is installed in the tubular member the skirt 17 grips the inner wall surface. The fingers 18 each have a loop 20 at their free ends the end edges of which lie on a circle of diameter less than that over the fingers 18 so that when installed in the tubular member a clearance exists between the free ends of the fingers and the inner wall surface thereby obviating fretting therebetween.

In the construction described the tubular member has a bore 5.14" and the rim of the grid is 5.045" diameter so that an annular clearance of the order .050" is effected therebetween. The diameter over the fingers 18 is 5.16" which provides an interference fit with the tubular member and the end edges of the fingers 18 lie on a circle of 5.125".

When the fuel element assembly is being installed in the tubular member, at the entrance to the member (which is formed to define a "lead-in" surface) the resilient fingers are deflected inwardly to allow the skirt to enter. In use in the nuclear reactor core the skirt engages the inner wall surface of the tubular member and interrupts the film flow of liquid coolant along the wall, the displaced liquid phase coolant serving to displace vapour phase coolant formed on the surface of the fuel rods thereby improving transfer of heat from the fuel rods to the coolant.

I claim:

1. A bracing grid for bracing the nuclear fuel rods of a cluster in spaced relationship, said grid having a rim for embracing said cluster of fuel rods, said rim being slitted to define resilient fingers which co-operate to form a substantially continuous annular skirt of boundary greater than the boundary of the rim to enable the skirt to grip resiliently the inner wall surface of a coolant tube of a nuclear reactor core.

2. A nuclear reactor fuel element assembly comprising: a cluster of spaced parallel fuel rods, end supports for locating said fuel rods, at least one transverse bracing grid for said fuel rods disposed intermediate said end supports, said bracing grid having an annular rim, said rim being slitted to define resilient fingers which co-operate to form a substantially continuous skirt of boundary greater than the boundary of the rim to enable the skirt to grip resiliently the inner wall surface of a coolant tube of a nuclear reactor core.

3. A nuclear reactor fuel element assembly according to claim 2 wherein the tips of the fingers are turned radially inwardly.

4. A nuclear reactor core comprising: a bulk of moderating material, a plurality of coolant tubes for containing nuclear fuel and for conducting coolant flow in liquid phase in heat exchange with the fuel to generate coolant in gaseous phase, said coolant tubes penetrating said bulk of moderating material in parallel array, a cluster of end supported, spaced, parallel nuclear fuel rods in at least one of said coolant tubes, at least one transverse bracing grid for said fuel rods disposed intermediate the ends of said cluster, said transverse bracing grid having an annular rim resiliently gripping the inner wall surface of said one of said coolant tubes continuously around the entire circumference of the tube.

References Cited

UNITED STATES PATENTS

| | | | |
|---|---|---|---|
| 3,150,057 | 9/1964 | Monson et al. | 176—78 |
| 3,185,632 | 5/1965 | Bradley | 176—78 X |
| 3,205,148 | 9/1965 | Waine et al. | 176—78 |
| 3,220,927 | 11/1965 | Bauer | 176—83 |
| 3,239,426 | 3/1966 | Waine et al. | 176—78 |
| 3,240,680 | 3/1966 | Laithwaite et al. | 176—76 X |
| 3,240,681 | 3/1966 | Waine et al. | 176—78 |

CARL D. QUARFORTH, *Primary Examiner.*

M. J. SCOLNICK, *Assistant Examiner.*